(12) United States Patent
Davidson et al.

(10) Patent No.: US 6,587,255 B2
(45) Date of Patent: Jul. 1, 2003

(54) ACOUSTO-OPTIC SCANNING SYSTEM WITH FAST NON-LINEAR SCAN

(75) Inventors: Nir Davidson, Rishon le Zion (IL); Nir Friedman, Rehovot (IL); Ariel Kaplan, Tel Aviv (IL)

(73) Assignee: Yeda Research and Development Co. LTD, Rehovot (IL)

( * ) Notice: Subject to any disclaimer, the term of this patent is extended or adjusted under 35 U.S.C. 154(b) by 0 days.

(21) Appl. No.: 10/021,903

(22) Filed: Dec. 13, 2001

(65) Prior Publication Data
US 2002/0141035 A1 Oct. 3, 2002

(30) Foreign Application Priority Data
Dec. 14, 2000 (IL) .................................. 140309

(51) Int. Cl.[7] .............................. G02F 1/33; G02F 1/11; G02F 1/01; H03H 9/00
(52) U.S. Cl. ..................... 359/314; 359/306; 359/310; 359/312; 359/238; 359/285; 359/287; 372/28; 333/150
(58) Field of Search .................. 359/305, 306, 359/307, 310, 311, 312, 314, 285, 287, 238, 239; 372/26, 28; 342/368; 333/150, 152

(56) References Cited

U.S. PATENT DOCUMENTS

| | | | | |
|---|---|---|---|---|
| 3,502,879 A | * | 3/1970 | Vallese | 359/314 |
| 4,164,717 A | * | 8/1979 | Blazey | 359/310 |
| 4,240,715 A | * | 12/1980 | McNaney | 359/310 |
| 4,330,178 A | * | 5/1982 | McNaney | 359/310 |
| 4,332,441 A | * | 6/1982 | Frosch et al. | 359/310 |
| 4,421,388 A | * | 12/1983 | Berg et al. | 359/306 |
| 4,566,760 A | * | 1/1986 | Abramovitz et al. | 359/306 |
| 4,602,852 A | * | 7/1986 | Moroz | 359/314 |
| 4,637,688 A | * | 1/1987 | Abramovitz et al. | 359/314 |
| 5,963,569 A | * | 10/1999 | Baumgart et al. | 372/28 |

OTHER PUBLICATIONS

N. Friedman, et al., "Compression of Cold Atoms to Very High Densities in a Rotating–Beam Blue–Detuned Optical Trap", in Physical Review A, vol. 61, pp. 031403–1–4(R) 2000.
R. Onofrio, et al., "Surface Excitations of a Bose–Einstein Condensate", in Physical Review Letters, vol. 84, pp. 810–813, 2000.
K.W. Madison et al., "Vortex Formation in a Stirred Bose–Einstein Condensate", in Physical Review Letters, vol. 84, pp. 806–809, 2000.
O. Bryngdahl and W.H. Lee, "Laser Beam Scanning using Computer–Generated Holograms", in Applied Optics, vol. 15, pp. 183–194, 1976.
A. VanderLugt, et al. "Design Relationships for Acousto–Optic Scanning Systems", Applied Optics, vol. 31, No. 20, Jul. 1992, pp. 4058–4068.
A. Kaplan, et al., "Acousto–Optic Lens with Very Fast Focus Scanning", Optics letters, vol. 26, No. 14, Jul. 2001, pp. 1078–1080.
Nir Friedman, et al., "Acousto–Optic canning System with Very Fast Nonlinear Scans", Optics Letters, vol. 25, No. 2, Dec. 2000, pp. 1762–1764.

* cited by examiner

Primary Examiner—Loha Ben
(74) Attorney, Agent, or Firm—Ladas & Parry (57) ABSTRACT

An acousto-optic scanning system, which relies on two counter propagating acoustic waves with the same frequency modulation. This scheme completely suppresses the linear frequency chirp, and thus enables the generation of fast non-linear scans and non-constant linear scans. By changing the phase between the modulating signals, this scheme also provides fast longitudinal scans of the focal point.

37 Claims, 9 Drawing Sheets

ACOUSTO-OPTIC SCANNING SYSTEM WITH FAST NON-LINEAR SCAN

FIELD OF THE INVENTION

The present invention relates to the field of acousto-optical scanners, especially those capable of generating fast non-linear scans, and/or fast longitudinal focus scanning.

BACKGROUND OF THE INVENTION

Acousto-optic scanners (AOS's) have no moving parts and are thus capable of scanning laser beams much faster than mechanical scanners. The limitation on the scanning speed of acousto-optic scanners arises from the transition or access time $T_{access}$ of the acoustic wave across the width of the laser beam. In most present applications, the requirement is for a scan angle $\alpha$ which is linear with time $\alpha(t)=at$. This is achieved by linear chirping of the acoustic wave frequency $f(t)$. For such linear scans the scan rate can approach $1/T_{access}$, since the effect of a linear chirp can be described as an effectively constant, time independent cylindrical lens, as shown by A. VanderLugt, in the book "Optical Signal Processing" published by John Wiley & Sons, 1992. Because of its time independence, such a lensing effect can be readily compensated for, by the addition of an external lens of identical and opposite power. There is consequently virtually no reduction in the number of resolvable points (NRP) obtainable from the scanner. This is shown in the article entitled "Design relationships for acousto-optical scanning systems" by A. VanderLugt, and A. M. Bardos, published in Applied Optics, Vol. 31, pp. 4058–4068 (1992).

In order to determine the limitations on the performance of such AOS's, the deflection of a uniform laser beam with a diameter D and a wavelength $\lambda$ is considered. Though the ensuing analysis deals with the case of a uniform laser beam, it is readily adapted to other beam shapes, with small changes in the numerical constants. The beam is Bragg deflected by a perpendicular acoustic wave with frequency $f(t)$ and velocity $v$ in an acousto-optic element. The angular scan-span in the first diffraction order is given by $\Delta\alpha=\Delta f\lambda/v$, where $\Delta f$ is the acoustic frequency span. Dividing $\Delta\alpha$ by the diffraction limited angular spread $\lambda/D$ yields the so called static, or low scan-rate NRP as:

$$NRP_{static}=\Delta fD/v=\Delta fT_{access}. \quad (1)$$

Equation (1) indicates that to achieve a large value of $NRP_{static}$, large values of $\Delta f$ and $T_{access}$ are required. Scanners with $\Delta f$ of more than 100 MHz are typically very expensive and suffer from reduced diffraction efficiencies and increased acoustic-wave absorption and heating. Hence, scanners with large $NRP_{static}$ mostly rely on the use of large values of $T_{access}$, which is achieved by a combination of a slow acoustic velocity (using shear-mode acoustic waves) and a large laser beam diameter.

Next, the effects of the scan time, $T_{scan}$, on the resolution are included. For a linear frequency chirp, which, as mentioned above, acts as a constant focal length cylindrical lens, $T_{scan}$ can approach $T_{access}$, and hence the dynamic (or fast-scan) resolution limit for linear scans is simply given by:

$$NRP_{dynamic,linear} \sim \leq \Delta fT_{scan}. \quad (2)$$

However, for some applications, it would be useful to have non-linear scans, namely scans with non-constant rate or a variable span. Non-linear acousto-optic scanners have recently attracted much attention for a variety of such applications. They have been used for generating two-dimensional circular scans to form dark optical dipole traps for ultra cold atoms, as described by N. Friedman et al, in Physical Review A, Vol. 61, page 031403(R) (2000), for stirring Bose-Einstein condensates, as described by R. Onofrio et al, in Physical Review Letters, Vol. 84, p. 810 (2000), and for rotating Bose-Einstein condensates, as described by K. W. Madison et al, in Physical Review Letters, Vol. 84, p. 806 (2000).

In addition, they are almost essential for ultra-fast laser vector plotters where arbitrary (and hence non-linear) scans are required to efficiently plot sparse information over a large area. For example, in order to plot a ring whose line width is 1000 times thinner than its diameter, $1000\pi$ resolvable points are required using a vector-plotter with a circular scan, as compared to 1,000,000 resolvable points using a conventional two-dimensional raster-mode scanner. Other applications include ultra-fast switching use in optical communication networks.

However, such non-linear scans must inherently use a non-constant frequency chirp, and since the focal length of the effective cylindrical lens is proportional to the chirp rate, the resulting effective lens is thus of constantly changing power, and so cannot be simply compensated for by the addition of an external lens. The result is a high level of aberrations and a drastically reduced NRP for fast scans.

An analysis of the combined limitations on speed and resolution for a non-linear AOS, similar to that performed above for the linear case, shows that such non-linear AOS's are indeed significantly inferior to linear scanners in these respects, as is now shown hereinbelow.

For arbitrary or totally random scans, which include $NRP_{dynamic}$ resolution points in a random order, $T_{scan}$ must be $NRP_{dynamic} \times T_{access}$. For a given scan time, there is an optimal value for the access time, $(T_{access})_{opt}=(T_{scan}/\Delta f)^{1/2}$, which results in a significantly worse limitation on the optimal resolution than that for a linear scan:

$$NRP_{dynamic,random} \sim \leq (\Delta fT_{scan})^{1/2}. \quad (3)$$

Using typical values of parameters of $\Delta f=100$ MHz and $T_{scan}=10\,\mu sec$, the linear scan has an NRP value of the order of ~1000 as compared to a value of the order of ~30 for the random scan. Such a level of NRP is unacceptable for many high resolution applications.

There therefore exists a serious need for a acousto-optical scanner capable of performing high-speed, non-linear scanning, while maintaining levels of NRP which are close to those typically attainable with equivalent linear scanners of similar specifications.

The disclosures of each of the publications mentioned in this section and in other sections of the specification, are hereby incorporated by reference, each in its entirety.

SUMMARY OF THE INVENTION

The present invention seeks to provide a new acousto-optic scanner capable of high scanning speed, by the use of two acoustic waves with the same frequency modulation, propagating in opposite directions through one or more acousto-optical media disposed in the path of the beam to be scanned. This scheme preferably completely suppresses the linear frequency chirp, and thus enables the generation of fast non-linear scans and non-constant linear scans, with only a limited reduction of the NRP as compared to the linear scan case. In addition, by changing the phase between the modulating signals, such a scanning system also preferably provides fast longitudinal scans of the focal point of the beam along the optical axis. The use of two counter propagating acoustic waves with the same frequency modulation, is applicable for providing one-dimensional scans, but the method can be readily generalized to two-dimensional scans by cascading two of such one-dimensional scanners orthogonally. One and two dimensional non-linear scans can also preferably be obtained with two and four acoustic transducers, respectively, attached to a single crystal. Three dimensional scans can preferably be obtained by means of combinations also involving scans of the center frequencies of the frequency modulated acoustic waves in the previously described embodiments.

There is further provided, in accordance with a preferred embodiment of the present invention, an acousto-optic scanner consisting of at least one acousto-optic element disposed in the path of a beam to be scanned, the element supporting at least two frequency-modulated, counter-propagating acoustic waves, such that the frequency chirp across the beam is essentially suppressed.

In the acousto-optical scanner described above, the counter-propagating acoustic waves may have essentially the same frequency modulation.

Furthermore, the at least one acousto-optic element may consist of at least two acousto-optic elements, each of the elements supporting one of the counter-propagating acoustic waves.

There is also provided in accordance with yet another preferred embodiment of the present invention, an acousto-optical scanner as described above, and wherein the essential suppression of the frequency chirp enables the generation of a fast, non-linear scan, or of a linear scan with non-constant parameters.

In accordance with still other preferred embodiments of the present invention, the acousto-optical scanner as described above may produce a scanned beam essentially free of aberrations arising from the first order chirp, and may also essentially eliminate longitudinal scan.

There is further provided in accordance with still another preferred embodiment of the present invention, a two-dimensional acousto-optical scanner consisting of at least one acousto-optic element disposed in the path of a beam to be scanned, the element supporting at least two sets of acoustic waves mutually angularly disposed to each other such that the beam is scanned in two dimensions, each set consisting of frequency-modulated, counter-propagating acoustic waves, such that the frequency chirp across the beam is essentially suppressed. Two of the at least two sets of acoustic waves may be essentially orthogonal.

In the two-dimensional acousto-optical scanner described above, each of the sets of counter-propagating acoustic waves may preferably have essentially the same frequency modulation.

Furthermore, the at least one acousto-optic element may preferably consist of at least two acousto-optic elements, each of the elements supporting at least one set of the counter-propagating acoustic waves.

In accordance with further preferred embodiments of the present invention, in the two-dimensional acousto-optical scanner described above the essential suppression of the frequency chirp may preferably enable the generation of a fast, non-linear scan, or of a linear scan with non-constant parameters.

There is provided in accordance with yet a further preferred embodiment of the present invention, a two-dimensional acousto-optical scanner as described above, and wherein the scanned beam is essentially free of aberrations arising from the first order chirp. Additionally, the two-dimensional acousto-optical scanner may preferably essentially eliminate longitudinal scan.

There is even further provided in accordance with a preferred embodiment of the present invention, an acousto-optic scanner consisting of at least one acousto-optic element disposed in the path of a beam to be longitudinally scanned, the element supporting at least two frequency modulated, counter-propagating acoustic waves, two of the waves having a phase angle between them such that the scanner provides a longitudinal scan of the focal plane of the beam. The phase angle may preferably be essentially $\pi$ radians.

Furthermore, in accordance with yet another preferred embodiment of the present invention, in the acousto-optical scanner described above, the at least one acousto-optic element may be at least two acousto-optic elements, each of the elements supporting one of the counter-propagating acoustic waves.

In accordance with yet another preferred embodiment of the present invention, the acousto-optical scanner described above may essentially eliminate lateral scan, and it may also produce the optical effect of a variable focus cylindrical lens.

There is further provided in accordance with yet more preferred embodiments of the present invention, an acousto-optical scanner as above, and wherein the counter-propagating acoustic waves have essentially the same frequency modulation or wherein the at least one acousto-optic element consists of at least two acousto-optic elements, each of the elements supporting one of the counter-propagating acoustic waves.

In accordance with still another preferred embodiment of the present invention, there is provided an acousto-optic scanner consisting of at least one acousto-optic element disposed in the path of a beam to be longitudinally scanned, the element supporting at least two sets of frequency modulated, counter-propagating acoustic waves, mutually angularly disposed to each other, two of the waves having a phase angle between them such that the scanner provides a longitudinal scan of the focal point of the beam, without any lateral displacement. Preferably, two of the at least two sets of acoustic waves are essentially orthogonal. Additionally, the phase angle is preferably essentially $\pi$ radians.

There is further provided in accordance with still another preferred embodiment of the present invention, a three-dimensional acousto-optical scanner consisting of at least one acousto-optic element disposed in the path of a beam to be scanned, the at least one element supporting at least two sets of acoustic waves, mutually angularly disposed to each other such that the beam is scanned in two dimensions, each set of acoustic waves consisting of frequency-modulated counter-propagating acoustic waves, and wherein the center frequencies of each of the two frequency-modulated counter-propagating acoustic waves are scanned, and wherein the counter-propagating acoustic waves in the sets have a phase angle between them such that the scanner provides a three dimensional scan of the focal point of the beam. Preferably, two of the at least two sets of acoustic waves are essentially orthogonal. Additionally, the phase angle is preferably essentially $\pi$ radians.

In accordance with a further preferred embodiment of the present invention, there is also provided an acousto-optic scanning system consisting of at least one acousto-optic element disposed in the path of a beam to be scanned, a generator for supplying frequency modulated drive signals such as to propagate acoustic waves in the at least one acousto-optic element, and a focusing element for focusing the scanned beam, and wherein the acoustic waves comprise at least two frequency-modulated counter-propagating acoustic waves, such that the frequency chirp across the beam is essentially suppressed.

There is provided in accordance with yet further preferred embodiments of the present invention, acousto-optic scanning systems, whether providing one dimensional or two dimensional lateral scans, or longitudinal scans, or combinations of both in order to provide three-dimensional scans, and which include any of the acousto-optic scanners described hereinabove.

There is even further provided in accordance with a preferred embodiment of the present invention, a method of generating a fast, non-linear scan of an optical beam, consisting of the steps of disposing at least one acousto-optic element in the path of the beam, and generating within the element at least two frequency-modulated counter-propagating acoustic waves, such that the frequency chirp across the beam is essentially suppressed.

In accordance with yet another preferred embodiment of the present invention, there is provided a method of generating a fast, longitudinal scan of the focal plane of an optical beam, consisting of the steps of disposing at least one acousto-optic element in the path of the beam, and generating within the element at least two frequency-modulated counter-propagating acoustic waves, two of the waves having a phase angle between them such that the scanner provides a longitudinal scan of the focal plane of the beam.

There is further provided in accordance with still another preferred embodiment of the present invention, a method of generating a fast, longitudinal scan of the focal point of an optical beam, consisting of the steps of disposing at least one acousto-optic element in the path of the beam, and generating within the element at least two sets of frequency-modulated counter-propagating acoustic waves, mutually angularly disposed to each other, two of the waves having a phase angle between them such that the scanner provides a longitudinal scan of the focal point of the beam without any lateral displacement.

In accordance with another preferred embodiment, there is also provided a method of generating a three-dimensional scan of the focal point of an optical beam, consisting of the steps of disposing at least one acousto-optic element in the path of the beam, and generating within the element at least two sets of acoustic waves, mutually angularly disposed to each other, each set of acoustic waves consisting of frequency-modulated counter-propagating acoustic waves, scanning the center frequencies of each of the two frequency-modulated counter-propagating acoustic waves, and wherein the counter-propagating acoustic waves in the sets have a phase angle between them such that the scanner provides a three dimensional scan of the focal point of the beam.

BRIEF DESCRIPTION OF THE DRAWINGS

The present invention will be understood and appreciated more fully from the following detailed description, taken in conjunction with the drawings in which:

FIGS. 2A to 2D are schematic illustrations of the operation of an AOS according to preferred embodiments of the present invention. In FIG. 2A, the effect of the linear chirp is denoted by the sawtooth-shaped function of the diffraction angle of the beam as the acoustic wave traverses the crystal;

FIGS. 2C to 2D are schematic illustrations of different scanners according to the present invention.

FIGS. 3A and 3B show the measured intensity cross-sections for a prior art cosine scan using a single acoustic wave. FIG. 3A is the result using a very slow scan rate of 1 kHz., while FIG. 3B shows a fast scan rate of 140 kHz;

FIGS. 4A and 4B show the measured intensity cross-sections using the two-acoustic wave configuration, according to a preferred embodiment of the present invention. FIG. 4A is the result using a very slow scan rate of 1 kHz., while FIG. 4B shows a fast scan rate of 140 kHz;

DETAILED DESCRIPTION OF PREFERRED EMBODIMENTS

Figure 1A:
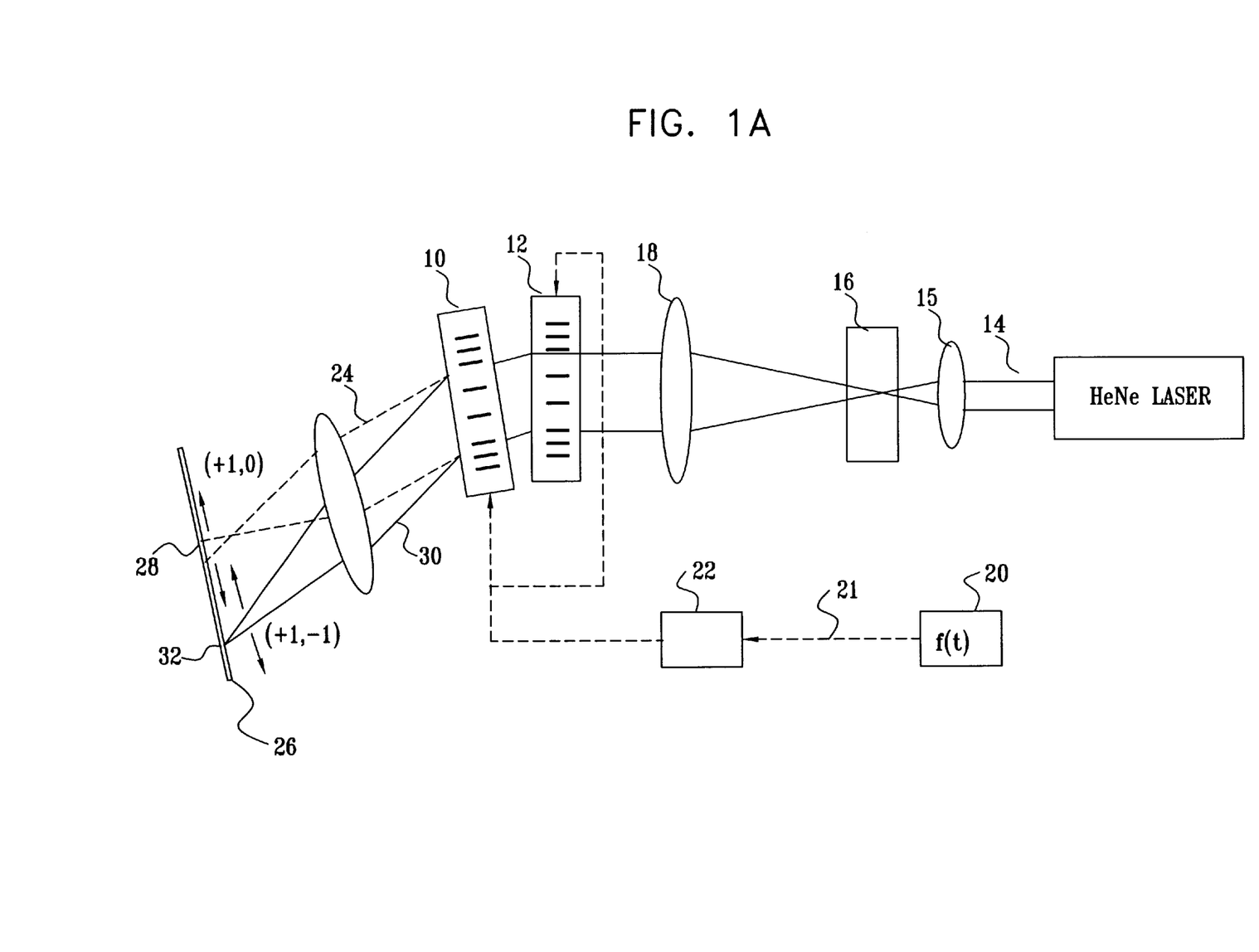
FIG. 1A is a schematic illustration of an acousto-optical system for performing fast non-linear scanning with high resolution, according to a preferred configuration of the present invention.

Reference is now made to FIG. 1A, which illustrates schematically an acousto-optical system for performing fast non-linear scanning with high resolution, according to a preferred configuration of the present invention. The system preferably incorporates a pair of acousto-optical elements 10, 12, propagating two adjacent and counter-propagating acoustic waves with the same acoustic frequency f(t). Alternatively and preferably, as shown in the preferred embodiment schematically illustrated in FIG. 1B, the two acoustic waves could be made to propagate in opposite directions through one acousto-optical element 11.

In use, a laser beam 14 is modulated by a fast acousto-optic modulator (AOM) 16 and collimated by means of collimating lens 18. It then passes through the two acousto-optic scanners 10, 12, (or in the alternative and preferable embodiment of FIG. 1B, through the single acousto-optical scanner 11) with oppositely directed acoustic waves carrying the same, desired, non-linear frequency chirp. The frequency chirped signal 21 is generated in a function generator 20, and amplified to the level required by the AOS by means of an AOS driver 22.

Figure 1B:
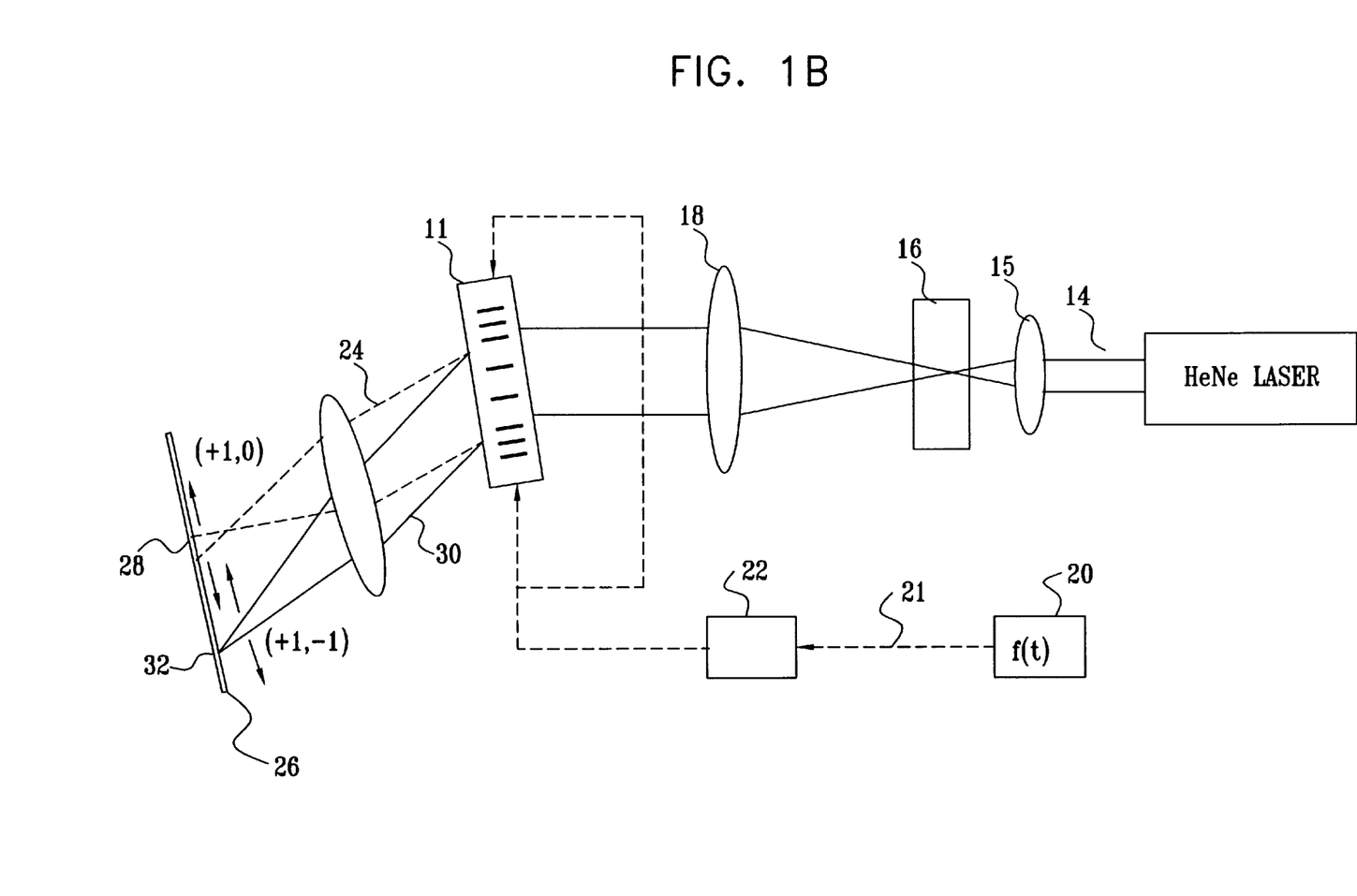
FIG. 1B is a schematic illustration of a system similar to that shown in FIG. 1A, but using a single acousto-optical element instead of the two elements used in FIG. 1A.

FIGS. 1A and 1B show the laser beam diffracted in two different configurations. The dotted beam path 24 is the result of the (+1, 0) order diffraction, and is modulated by only one AOS. It has a reduced NRP due to the varying chirp, and this is shown in the plane of the CCD detector 26 by a spread-out focal position 28. The beam diffracted by the (+1, −1) order, on the other hand, shown by the full line 30, is modulated by both AOS's, and has a smaller focal spot 32 and hence higher NRP, due to the elimination of aberrations resulting from suppression of the first order chirp. The Bragg angles of the two acoustic waves are adjusted to maximize the efficiency of the +1 and −1 diffraction orders of the first and second acoustic waves, respectively. Neglecting the distance between the acoustic waves, the total diffraction angle across the beam in the (+1, −1) order is then given by:

$$\alpha(x,t) = \lambda/v[f(t+x/v) + f(t-x/v)] \quad (4)$$

where x is the distance from the center of the laser beam. If the beam impinges the AO element centrally, x is then equidistant from the two oppositely located transducers.

For a linear frequency chirp, Equation (4) yields $\alpha(x, t) = 2\alpha(x=0, t)$. This means that:

(i) the scanning angle is twice that of a single scanner, and (ii) the chirp is completely eliminated, since the deflection angle is independent of x.

Consequently, there is no cylindrical lens effect, and no compensating lens is needed. Since elimination of the chirp remains true regardless of the values of $T_{scan}$ and $\Delta f$, their values can be changed at a very high rate without having to replace or mechanically move a compensating lens, as is the case with conventional scanners using only one acoustic wave. The two-acoustic wave scanner, according to this preferred embodiment of the present invention, is thus able to perform non-linear scans and non-constant linear scans, such as linear scans with parameters which may change, at high rates and at high NRP levels, with limitations which can approach those of a compensated linear scanner of similar specification.

Figure 2A:
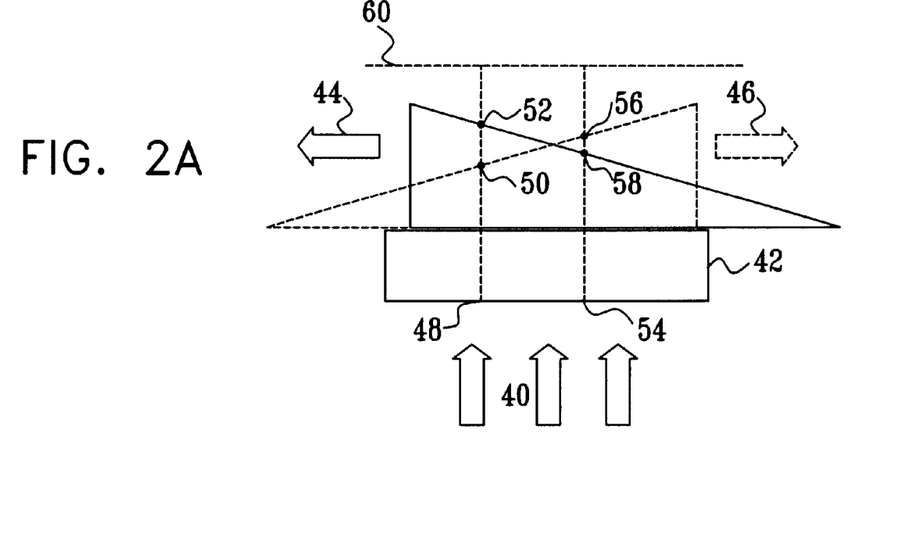
Figure 2B:
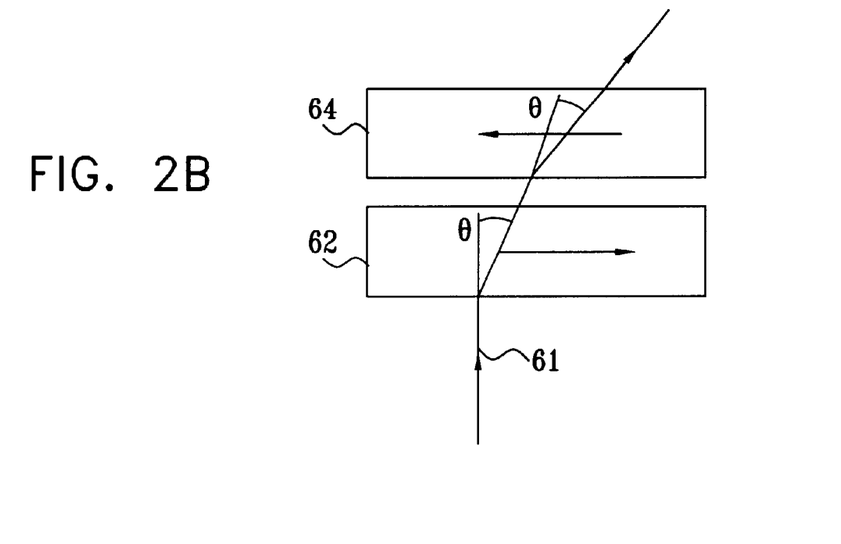
FIG. 2B shows the path of the beam through the pair of acousto-optical elements schematically shown in FIG. 2A.

Reference is now made to FIGS. 2A and 2B, which schematically illustrate the mathematical formalism of equation (4). In FIG. 2A, the effect of the linear chirp is denoted by the sawtooth-shaped function of the diffraction angle of the laser beam 40 as the acoustic waves traverse the crystal 42. The ordinate of the sawtooth is a measure of the beam diffraction angle. Since the diffraction order of the leftward moving wave, denoted schematically by sawtooth 44 with the solid outline, and the rightward moving wave, denoted schematically by 46 with the dashed outline, are selected to be of opposite sign, the total angle diffracted is thus the sum of the heights of the two sawtooth waves. As is seen from FIG. 2A, this sum is constant across the beam, regardless of the position of the two traversing acoustic waves as they propagate towards each other through the crystal. Thus, for example, for light incident at position 48, the total diffracted angle is the sum of angles 50 and 52, and at position 54, it is the sum of angles 56 and 58, and so on. Because of the linear nature of the sawtooths, each of these sums, signifying the total angle of diffraction, is fixed at the level 60, independent of the rate of motion or slope of the sawtooths. The significance of this is that the total angle of diffraction changes at a high rate as the sawtooths propagate, but is always constant across the beam such that the cylindrical lens effect is absent. This compensation of the lens effect is independent of the rate of motion or the slope of the sawtooths, with the consequent advantages explained above.

Reference is now made to FIG. 2B, which shows the diffracted path of the beam through a pair of acousto-optical elements 62, 64, such as those schematically shown in FIG. 2A. To simplify the drawing, refraction effects have been ignored, and only the effect of the diffraction shown. On entering element 62, the input beam 61 is diffracted through an angle θ. Even though the two elements have counter propagating waves, which would be expected to diffract in opposite directions, the diffraction orders of opposite sign in the two elements ensures that the diffraction angle in the second AO element is also θ, such that the diffraction effect on the scanned beam is additive, totaling 2θ.

Figure 2C:
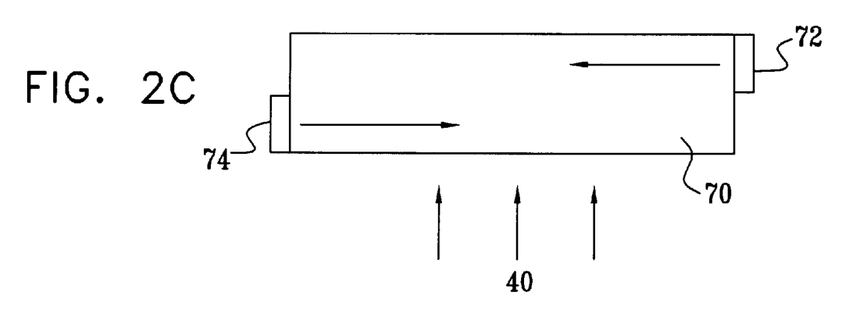
FIG. 2C shows an alternative and preferred embodiment of the scanner illustrated in FIG. 2B, wherein use is made of only one acousto-optic element.
Figure 2D:
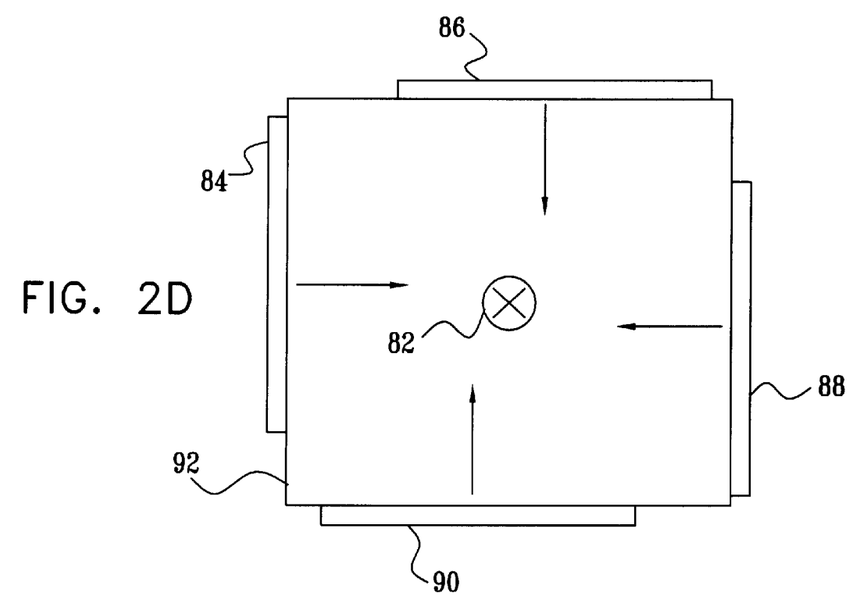
FIG. 2D illustrates another preferred embodiment of the present invention, wherein offset transducers are attached to four sides of an acousto-optic element, thereby producing a two-dimensional, fast, non-linear scanner.

FIGS. 2C to 2D are schematic illustrations of different scanners according to the present invention. FIG. 2C shows an alternative and preferred embodiment of the one dimensional scanner, where use is made of only one acousto-optic element 70, and the transducers 72, 74, for generating the acousto-optic waves are affixed at opposite ends of the element and preferably offset, from each other. Such an element would preferably be used in the embodiment shown in FIG. 1B.

FIG. 2D illustrates yet a further preferred embodiment of the present invention. Offset transducers 84, 86, 88, 90, are attached to four sides of an acousto-optic element 92, each facing pair of transducers being fed with a radio frequency FM modulated signal which generates a pair of counter propagating acoustic waves. According to this embodiment, a two-dimensional, fast, non-linear scan can be imparted to a laser beam 82 directed through the element perpendicular to the propagation plane of the acoustic waves.

Returning to the mathematical formalism, it is clear that for non-linear scans, Equation (4) indicates that the preferred configuration according to the present invention suppresses the linear chirp term, which is proportional to the first derivative of f(t), leaving only the higher order derivatives, and thus reducing aberrations and improving the resolution for fast scans. To illustrate the outcome of this result, an analysis is made of the effect of a cosine scan, expressed by:

$$f(t) = f_0 + 0.5\Delta f \cos(2\pi t/T_{scan}). \quad (5)$$

Such a scan function is useful for generating a two-dimensional circular or elliptical scan. The linear chirp, given by the first derivative of f(t), is in the range $\pm \pi \Delta f / T_{scan}$, yielding for a single acoustic wave, a limitation for the NRP of:

$$NRP_{dynamic,cos} \sim \leq 1/\pi \times (\Delta f T_{scan})^{1/2}.$$

According to preferred embodiments using the double acoustic wave technique of the present invention, Equation (4) yields that:

$$\alpha(x,t) = \lambda/v \times [2f_0 + \Delta f \cos(k_{scan}x)\cos(2\pi t/T_{scan})]$$

where $k_{scan} = 2\pi/vT_{scan}$, is the modulation wavenumber. Around x=0, i.e. at the center of the beam, $\alpha(x, t)$ has no linear gradient at any time t. To calculate the NRP for these embodiments, the variations of $\alpha(x, t)$ across the laser beam diameter (−0.5 D<x<0.5 D) must be smaller than the static resolution limit given by the value of $\lambda \Delta f / vNRP_{new}$. Using a quadratic approximation for the cosine function and the optimal $T_{access}$, the dynamic optimal NRP is derived as:

$$NRP_{dynamic,new} \sim \leq (\Delta f T_{scan})^{2/3} \quad (7)$$

$$\sim \leq (4)^{1/3} (f''_{max}/\Delta f)^{-1/3} \times (\Delta f T_{scan})^{2/3}. \quad (8)$$

Expression (7) describes the cosine scan, while expression (8) is an extension to the general non-linear scan. Here $f'' = \partial^2 f / \partial \tau^2$ is the normalized second derivative of the desired scan function, f(t), and the contribution of higher derivatives has been neglected. τ is defined by $\tau = t/T_{scan}$. Equation (7) indicates that it is the second-order derivative which limits the NRP for non-linear scans in this preferred configuration of the present invention, since the variable linear chirp term is completely corrected. Hence, the $\frac{2}{3}$ power dependence of the NRP on $\Delta f T_{scan}$ is indeed intermediate between the linear scan, which has a power of 1 dependence, and the random scan which has a power of ½ dependence. It is to be observed that when f" approaches zero, Equation (7) predicts an infinite NRP, and therefore cannot be used, since the NRP cannot exceed the slow scan limit expressed in Equation (1).

Reference is now made to FIGS. 3A, 3B, 4A and 4B, which show the results of different examples of acousto-optical scanners according to various preferred embodiment of the present invention. For obtaining these results, the preferred configuration of FIG. 1A was used.

A HeNe laser beam with $\lambda=633$ nm and D=2.6 mm was passed through two adjacent AOS's, model TEF-110-60 units manufactured by the Brimrose Corporation of Baltimore, Md., USA. The frequencies used were $f_0=110$ MHz, $\Delta f=60$ MHz and for the AOS used, $v=4200$ m/s. The value of $T_{access}$ is therefore 0.62 $\mu$sec. The (+1, −1) diffraction order, together with the (+1, 0) order that was used for comparison, was focused by a lens with a 150 mm focal length onto a high resolution black and white CCD camera, Model SSC-M370CE, manufactured by the SONY Corporation of Tokyo, Japan. Separation of the (+1, −1) diffraction order from the (+1, 0) order is ensured by the condition $f_{max}<2f_{min}$, where $f_{max}$ is the maximum acoustic frequency used and $f_{min}$ is the minimum acoustic frequency used. To measure the spot size during the scan, the laser beam was synchronously pulsed using a separate acousto-optic modulator operating at a fixed frequency. A lens 15 was used to tightly focus the beam onto the modulator, and the pulse length reduced to less than 100 nsec, thus ensuring a negligible contribution of the finite pulse time to the resolution. The acoustic frequency f(t) was scanned according to Equation (5), using the above parameters.

Figure 3A:
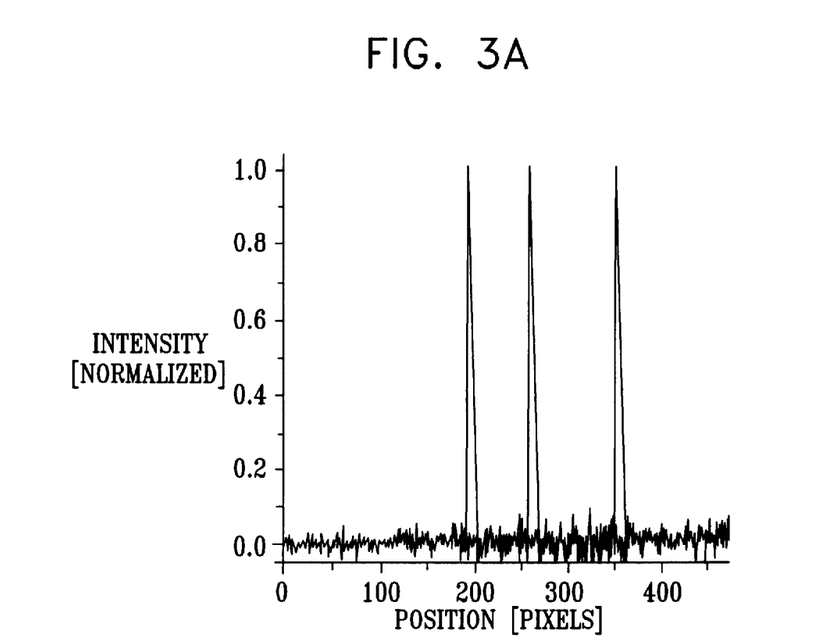
Figure 3B:
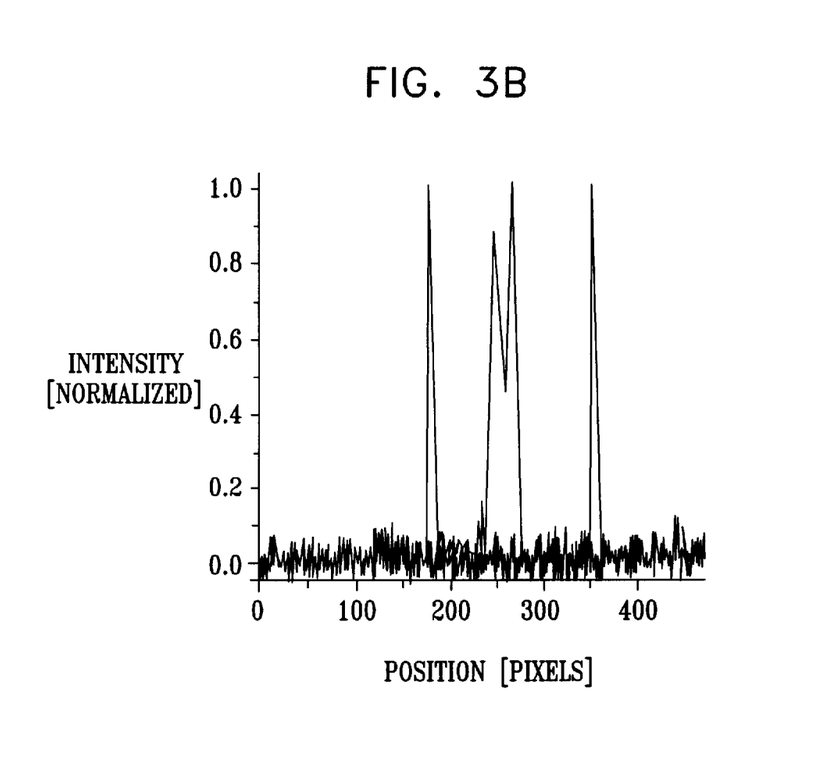

Reference is now made to FIGS. 3A and 3B which show the measured intensity cross-sections for the (+1, 0) order, for a cosine scan using a single acoustic wave, according to the prior art methods. FIG. 3A is the result using a very slow scan rate of $f_{scan}=1/T_{scan}=1$ kHz., while FIG. 3B shows a fast scan rate of 140 kHz. At each scan rate, three spots are shown: one at the extreme right of the scan line from a pulse at t≈0, one in the middle from a pulse at $t \approx T_{scan}/4$ and one at the extreme left from a pulse at $t \approx T_{scan}/2$.

In the case of FIG. 3A, the static NRP, measured by dividing the scan-span by the maximal FWHM spot size, was $NRP_{static}=42$, in good agreement with a value of 37 calculated using the above parameters. For the fast scan case shown in FIG. 3B, where, as is seen from Equation (5), a large linear chirp exists, the spot size at the center ($t=T_{scan}/4$), is much larger than at the two sides (t≈0 and $t \approx T_{scan}/2$) where the linear chirp is zero. The NRP in this case is reduced to a value as low as 8.

Figure 4A:
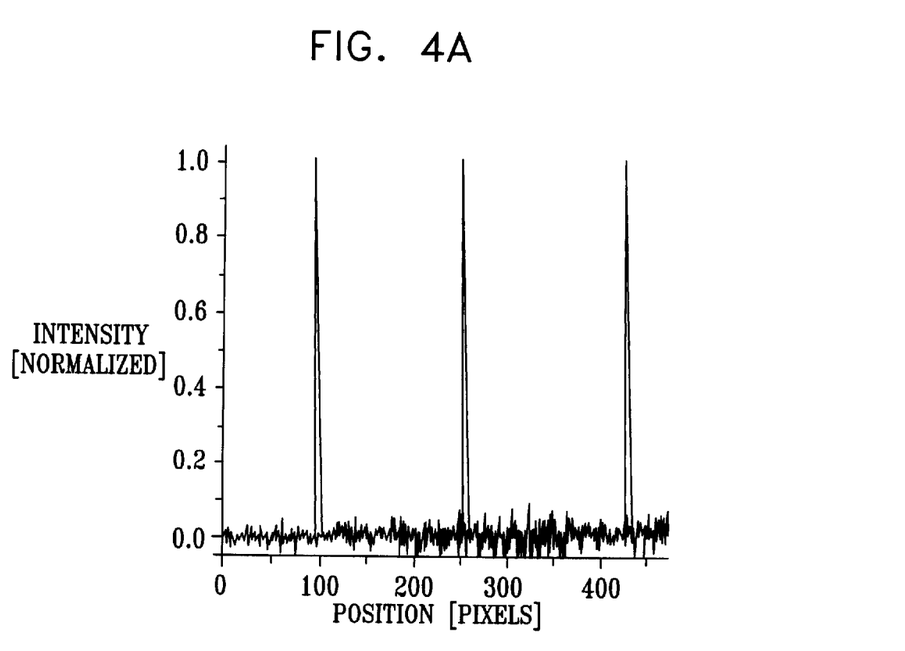
Figure 4B:
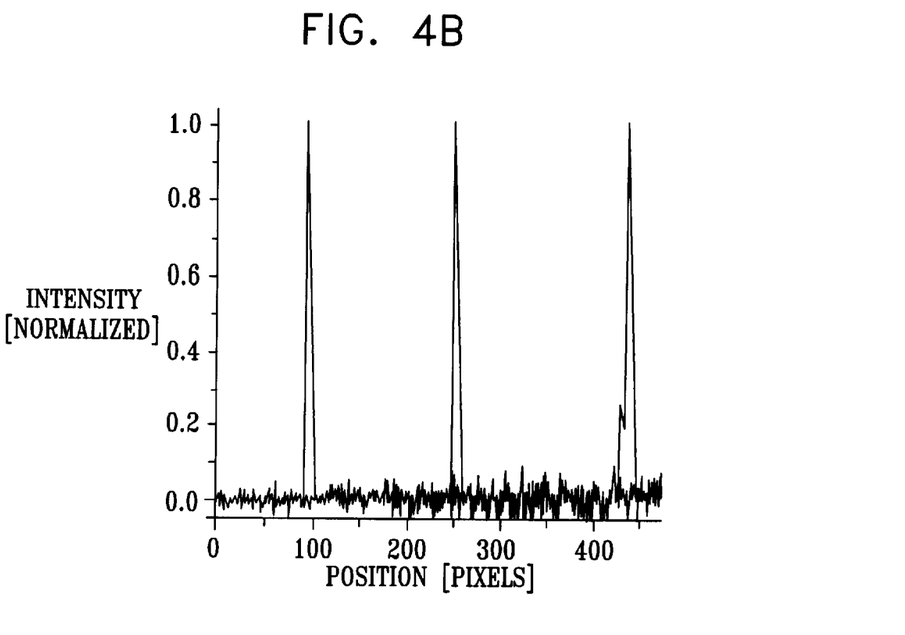

Reference is now made to FIGS. 4A and 4B, which show the same measurements for the (+1, −1) order using the two-acoustic wave configuration, according to a preferred embodiment of the present invention. As for FIGS. 3A and 3B, two scan rates are shown, 1 kHz, and 140 kHz. The static NRP (FIG. 4A) is now 78, approximately twice the $NRP_{static}$ of the single acoustic wave case shown in FIG. 3A, since the spot size is unchanged and the scan span is doubled. However, the most dramatic improvement is shown in the case of the fast scan (FIG. 4B) where all three spots, including the one at the scan center, remain virtually unchanged and the measured $NRP_{dynamic}$ is 46, which is very close to the optimal value of $\leq 57$ calculated from Expression (7). Furthermore, this value is approximately six times larger than that of the prior art single acoustic wave fast scan result shown in FIG. 3B. Even larger improvement is expected for an AOS with a larger beam diameter D and a slower wave velocity v.

Figure 5:
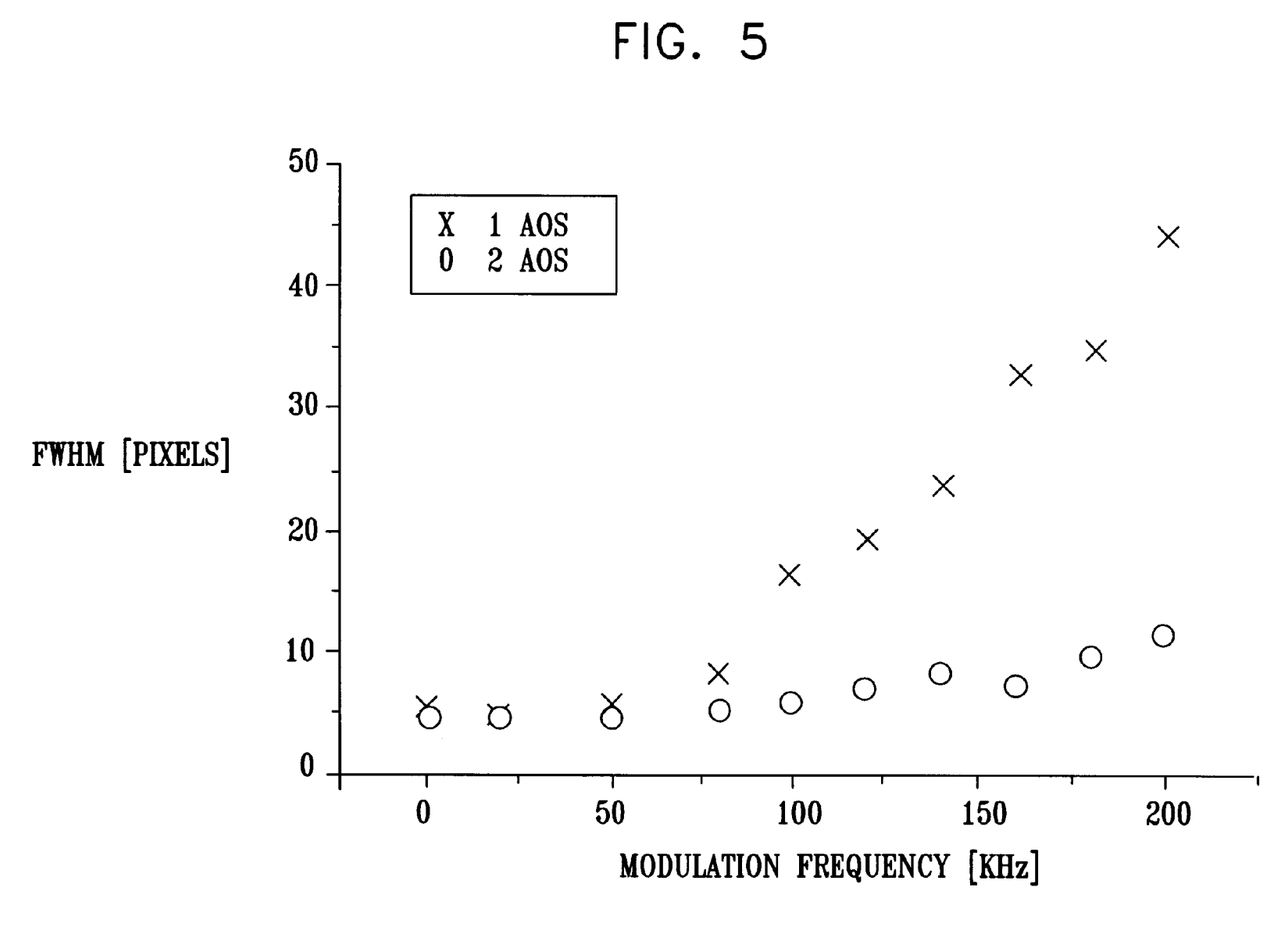
FIG. 5 is a graph showing the measured spot size of the central spot of the scanned output as a function of the scan frequency for a cosine scan with the same parameters as those shown in FIG. 4.

Reference is now made to FIG. 5, which is a graph showing the measured spot size of the central spot ($t=T_{scan}/4$) as a function of the scan frequency for a cosine scan with the same parameters as shown in FIGS. 3 and 4. Two sets of measurements are shown. The measurements marked X are for the prior art method using a single acoustic wave scan, while the measurements marked O are for the method using a double acoustic wave scan according to the present invention. As is seen, the method and apparatus according to the present invention suppresses the spot-size increase due to dynamic chirping effects up to a much faster scan rate than the conventional prior art single wave scanner, thereby enabling the attainment of a combination of both high resolution and fast scan rates.

The concept of counter-propagating acoustic wave gratings can be advantageously applied in the non-linear and non-constant holographic scanners, described, for example, by O. Bryngdahl and W. H. Lee in Applied Optics, Vol. 15, p. 183 (1976).

Inspection of Equation (6) above predicts that around $x=\pi/2k_{scan}$, which is equivalent to the introduction of a phase shift of $\pi$ radians between the cosine modulations of the counter-propagating acoustic waves, the lateral scan of the (+1, −1) order vanishes, and a pure longitudinal or focal scan is obtained. Such a scan is a linear chirp which changes with time between the values $df/dx=\pm \Delta f k_{scan}$. This is equivalent to a lens with an effective focal length which changes in time, at the fast scan rate. This embodiment of the present invention can be simply described as differing from the previously described embodiments in that in the previously mentioned embodiments, it is the focal variation which is cancelled out by means of the correctly selected diffraction orders, and the desired transverse scan is preserved by means of the additive effect of the two acoustic waves. In this embodiment, on the other hand, the diffraction orders are selected, and the mutual phase difference between the two acoustic waves is selected, such that it is the longitudinal scans from the two acoustic waves which are additive, while the transverse scans cancel subtractively.

Figure 6:
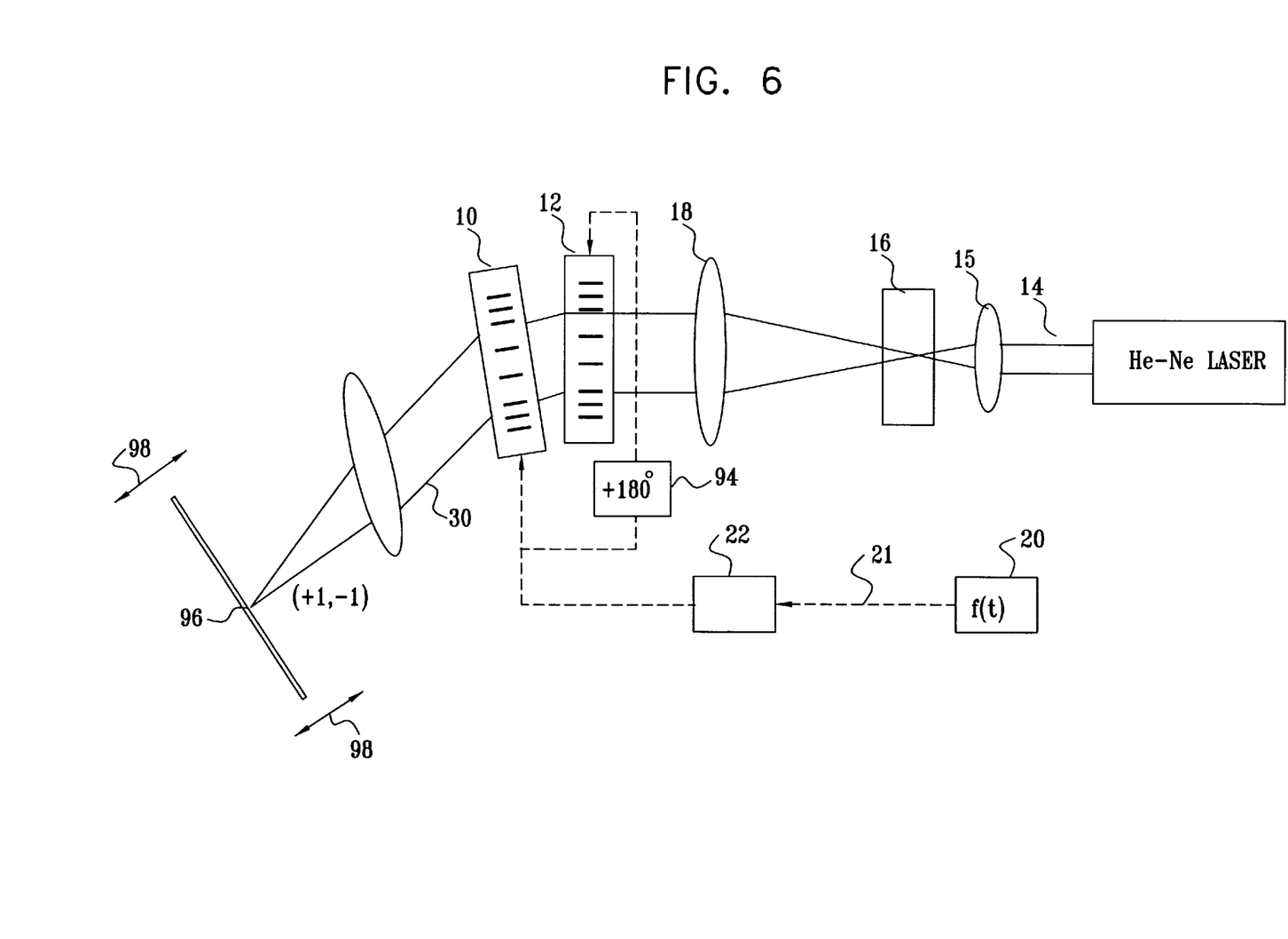
FIG. 6 is a schematic illustration of a preferred system for implementation of an embodiment of the present invention for performing fast longitudinal focal scanning.

A preferred system for implementation of this embodiment of the present invention is shown schematically in FIG. 6. The system is similar to that shown in FIG. 1A, and uses common reference signs. Only the (+1, −1) diffraction order beam path is shown. The system of FIG. 6 differs, though, in that the signals are applied essentially in antiphase to the two transducers generating the counter-propagating acoustic waves, by means of a $\pi$ phase-retarder or phase-advancer 94 in one of the drive signal inputs. As a result, the focal point 96 of the AO diffracted scanned beam remains fixed in the lateral plane, but undergoes a longitudinal focal scan 98 in the direction of the beam axis. It is to be understood that similar results would also be obtained using a system such as that shown in FIG. 1B, but with the signals applied essentially in antiphase to the two transducers on the ends of the single AO element. Though the term antiphase would usually be taken to mean that the two acoustic waves are exactly out of phase with each other, it is to be understood that these longitudinal scan embodiments are also operable, at reduced efficiency, even if the phase difference is not exactly 180°. It is thus understood in this specification that the acoustic waves have a phase angle between them sufficiently close to $\pi$ that the longitudinal scanning is sufficient for its intended use.

Figure 7:
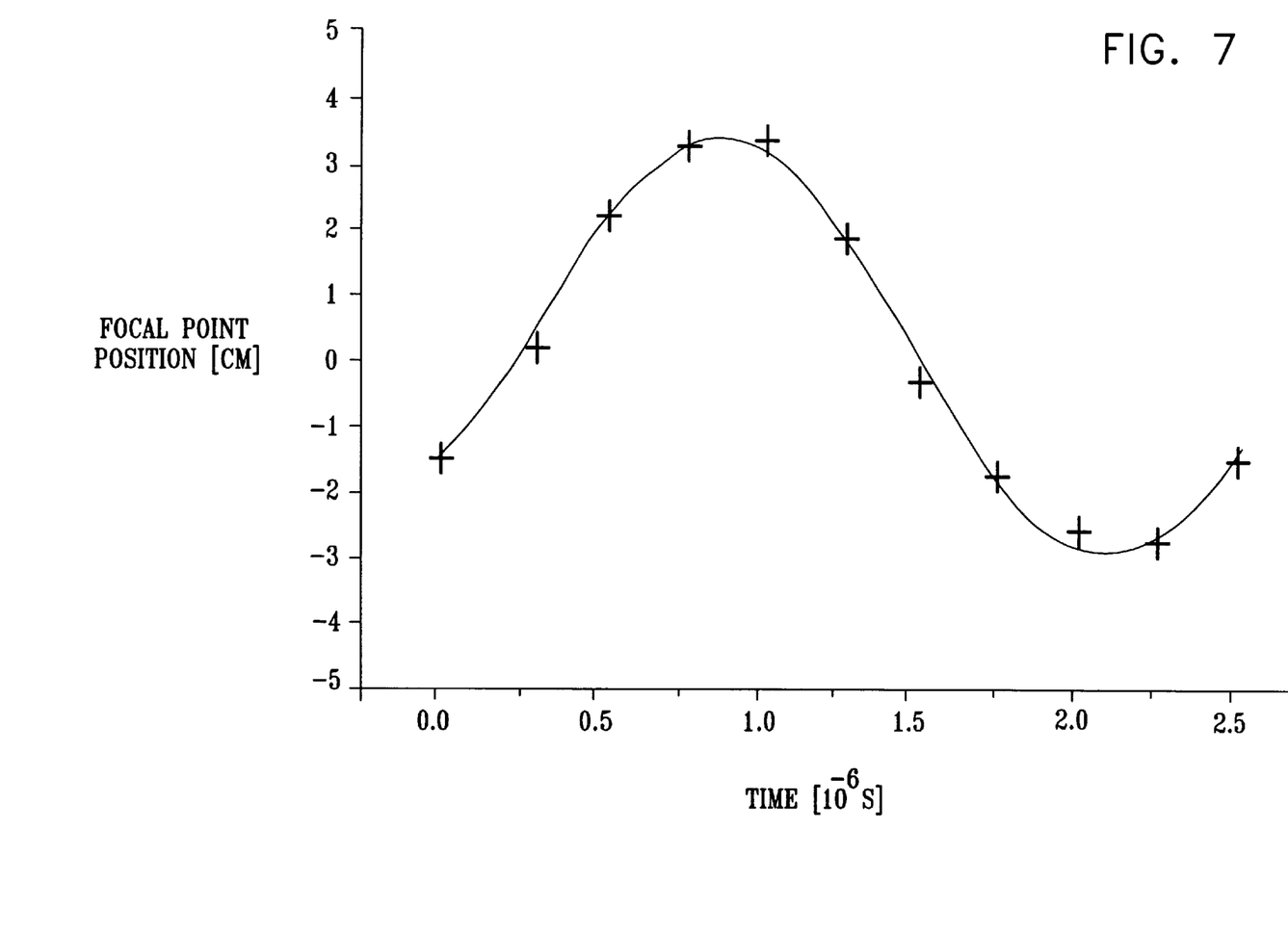
FIG. 7 shows the results obtained from a longitudinal scanner according to a preferred embodiment of the present invention, operating at a rate of 400 kHz.

Reference is now made to FIG. 7, which shows results obtained from a longitudinal scanner constructed and operative according to this preferred embodiment of the present invention. The position of the focal point is plotted as a function of time, when the focal point is sinusoidally scanned over a 6 cm range at 400 kHz. Such a scanning rate is about two orders of magnitude faster than the fastest mechanical methods that are currently used. It was confirmed that no lateral shift of the spot exists, and that the spot size at the focus, which was 44 μm, in agreement with a diffraction limited spot for the beam diameter used of 2.6 mm, is not increased in comparison with the static spot size.

The embodiment described above enables the execution of longitudinal scans of a one dimensional line-focused beam, such as is expected from a cylindrical lens. By adding two additional AOS's, perpendicular to the first two, it is possible to perform simulation of a fast longitudinal focusing effect of a two-dimensional, or spherical lens, with comparable scan rates. Alternatively and preferably, the four Furthermore, referring again to the system of FIG. 6, the center frequency $f_0$ of the frequency scan can also be varied, or scanned at an independent rate, causing the spot lateral position to change in time, independently of the longitudinal scan. This results in a combined scan comprised of a one-dimensional (line) lateral scan and a one-dimensional (cylindrical lens) longitudinal scan. In a similar way, by adding two additional AOS's, perpendicular to the first two, it is possible to construct a system with a combined scan comprised of two-dimensional (area) lateral scan and two-dimensional (spherical lens) longitudinal scan. Alternatively, the four acoustic waves can be generated in the same crystal as in FIG. 2D.

Some possible scanning combinations according to various preferred embodiments of the present invention, and preferred methods of realizing these combinations are shown in the following table.

| Application | Number of acoustic waves | Preferred realization |
|---|---|---|
| 1.1 1-D pure lateral (line) scan | 2 | Frequency modulation of two identical counter-propagating acoustic waves |
| 1.2 2-D pure lateral (area) scan | 4 | Frequency modulation of two independent and orthogonal pairs of identical counter-propagating acoustic wave |
| 2.1 Effective cylindrical lens with pure longitudinal (focal) scan | 2 | Frequency modulation of two counter-propagating acoustic waves, with a 180° phase between them. |
| 2.2 Effective spherical lens with pure longitudinal (focal) scan | 4 | Frequency modulation of two independent and orthogonal pairs of counter-propagating acoustic waves, with a 180° phase between the waves in each pair. |
| 3.1 Combined 1-D lateral (line) scan, with effective cylindrical lens with focal scan | 2 | Frequency modulation of two counter-propagating acoustic waves, with a 180° phase between them, together with a scan of the central modulation frequency. |
| 3.2 Combined 2-D lateral (area) scan, with effective spherical lens with focal scan | 4 | Frequency modulation of two independent and orthogonal pairs of counter-propagating acoustic waves, with a 180° phase between the waves in each pair, together with an independent scan of the two central modulation frequencies. |
| 3.3 Arbitrary 1-D lateral scan, with arbitrary cylindrical lens focal scan | 2 | Frequency modulation of two counter-propagating acoustic waves, with an application specific modulation of the phase between them. |
| 3.4 Arbitrary 2-D lateral scan, with arbitrary spherical lens focal scan | 4 | Frequency modulation of two independent and orthogonal pairs of counter-propagating acoustic waves, with an application specific modulation of the phase between the waves in each pair | acoustic waves can be generated in the same crystal as in the embodiment shown in FIG. 2D.

Also, according to further preferred embodiments of the present invention, it is possible to generate general three-dimensional beam scans by means of combinations of the pure lateral scan and the pure longitudinal scan. By independently controlling the frequencies of all the acoustic waves and of their relative phases, the longitudinal and lateral scans can be simultaneously and independently controlled, hence generating general three-dimensional scans.

Finally, throughout this application, it is appreciated that any acoustic wave can be generated from a vector addition of two other acoustic waves. Consequently, any reference within this specification to an acoustic wave having a specific direction is understood to include an acoustic wave arising from the vector combination of other directed acoustic waves.

The combination of fast laser beam scan over large spans combined with high spatial resolution, as enabled by the present invention, has applications in optical information processing, laser vector-plotters, laser material processing, laser inspection of micro-electronic chips and boards and laser manipulation of atoms, ions and microscopic particles. Very fast scans of the focal point can be used for error-focus detection in very fast compact discs and DVD readers, for real-time optical profilometers and confocal microscopes, for laser material processing, for optical data storage, and for optical inspection.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. An acousto-optical scanner comprising at least one acousto-optic element disposed in the path of a beam to be scanned, said element supporting at least two frequency-modulated, counter-propagating acoustic waves, such that the frequency chirp across said beam is essentially suppressed.

2. An acousto-optical scanner according to claim 1 and wherein said counter-propagating acoustic waves have essentially the same frequency modulation.

3. An acousto-optical scanner according to claim 1 and wherein said at least one acousto-optic element comprises at least two acousto-optic elements, each of said elements supporting one of said counter-propagating acoustic waves.

4. An acousto-optical scanner according to claim 1 and wherein said essential suppression of said frequency chirp enables the generation of a fast, non-linear scan.

5. An acousto-optical scanner according to claim 1 and wherein said essential suppression of said frequency chirp enables the generation of a linear scan with non-constant parameters.

6. An acousto-optical scanner according to claim 1 and wherein said scanned beam is essentially free of aberrations arising from the first order chirp.

7. An acousto-optical scanner according to claim 1 and which essentially eliminates longitudinal scan.

8. An acousto-optic scanning system comprising an acousto-optical scanner according to claim 1.

9. A two-dimensional acousto-optical scanner comprising at least one acousto-optic element disposed in the path of a beam to be scanned, said element supporting at least two sets of acoustic waves mutually angularly disposed to each other such that the beam is scanned in two dimensions, each set comprising frequency-modulated, counter-propagating acoustic waves, such that the frequency chirp across said beam is essentially suppressed.

10. A two-dimensional acousto-optical scanner according to claim 9 and wherein two of said at least two sets of acoustic waves are essentially orthogonal.

11. A two-dimensional acousto-optical scanner according to claim 9 and wherein each of said sets of counter-propagating acoustic waves have essentially the same frequency modulation.

12. A two-dimensional acousto-optical scanner according to claim 9 and wherein said at least one acousto-optic element comprises at least two acousto-optic elements, each of said elements supporting at least one set of said counter-propagating acoustic waves.

13. A two-dimensional acousto-optical scanner according to claim 9 and wherein said essential suppression of said frequency chirp enables the generation of a fast, non-linear scan.

14. A two-dimensional acousto-optical scanner according to any of claims 9 to 12, and wherein said essential suppression of said frequency chirp enables the generation of a linear scan with non-constant parameters.

15. A two-dimensional acousto-optical scanner according to claim 9 and wherein said scanned beam is essentially free of aberrations arising from the first order chirp.

16. A two-dimensional acousto-optical scanner according to claim 9 and which essentially eliminates longitudinal scan.

17. A two-dimensional acousto-optic scanning system comprising an acousto-optical scanner according to claim 9.

18. An acousto-optical scanner comprising at least one acousto-optic element disposed in the path of a beam to be longitudinally scanned, said element supporting at least two frequency modulated, counter-propagating acoustic waves, two of said waves having a phase angle between them such that said scanner provides a longitudinal scan of a focal plane of the beam.

19. An acousto-optical scanner according to claim 18 and wherein said phase angle is essentially $\pi$ radians.

20. An acousto-optical scanner according to claim 18 and wherein said at least one acousto-optic element comprises at least two acousto-optic elements, each of said elements supporting one of said counter-propagating acoustic waves.

21. An acousto-optical scanner according to claim 18 and which essentially eliminates lateral scan.

22. An acousto-optical scanner according to claim 18 and which has the optical effect of a variable focus cylindrical lens.

23. An acousto-optical scanner according to claim 18 and wherein said counter-propagating acoustic waves have essentially the same frequency modulation.

24. An acousto-optical longitudinal scanning system comprising an acousto-optical scanner according to claim 18.

25. An acousto-optical scanner comprising at least one acousto-optic element disposed in the path of a beam to be longitudinally scanned, said element supporting at least two sets of frequency modulated, counter-propagating acoustic waves, mutually angularly disposed to each other, two of said waves having a phase angle between them such that said scanner provides a longitudinal scan of a focal point of the beam, without lateral displacement.

26. An acousto-optical scanner according to claim 25 and wherein two of said at least two sets of acoustic waves are essentially orthogonal.

27. An acousto-optical scanner according to claim 25 and wherein said phase angle is essentially $\pi$ radians.

28. An acousto-optic longitudinal scanning system comprising an acousto-optical scanner according to claim 25.

29. A three-dimensional acousto-optical scanner comprising at least one acousto-optic element disposed in the path of a beam to be scanned, said at least one element supporting at least two sets of acoustic waves, mutually angularly disposed to each other such that the beam is scanned in two dimensions, each set of acoustic waves comprising frequency-modulated counter-propagating acoustic waves, and wherein the center frequencies of each of said two frequency-modulated counter-propagating acoustic waves are scanned, and wherein said counter-propagating acoustic waves in said sets have a phase angle between them such that said scanner provides a three dimensional scan of a focal point of said beam.

30. A three-dimensional acousto-optical scanner according to claim 29 and wherein two of said at least two sets of acoustic waves are essentially orthogonal.

31. An acousto-optical scanner according to claim 29 and wherein said phase angle is essentially $\pi$ radians.

32. A three-dimensional acousto-optic scanning system comprising an acousto-optical scanner according to claim 29.

33. An acousto-optic scanning system comprising:
at least one acousto-optic element disposed in the path of a beam to be scanned;
a generator for supplying frequency modulated drive signals such as to propagate acoustic waves in said at least one acousto-optic element; and
a focusing element for focusing said scanned beam;
and wherein said acoustic waves comprise at least two frequency-modulated counter-propagating acoustic waves, such that the frequency chirp across said beam is essentially suppressed.

34. A method of generating a fast, non-linear scan of an optical beam, comprising the steps of:
disposing at least one acousto-optic element in the path of said beam; and
generating within said at least one acousto-optic element at least two frequency-modulated counter-propagating acoustic waves, such that the frequency chirp across said beam is essentially suppressed.

35. A method of generating by an acousto-optical scanner a fast, longitudinal scan of a focal plane of an optical beam, comprising the steps of:
disposing at least one acousto-optic element in the path of said beam; and
generating within said element at least two frequency-modulated counter-propagating acoustic waves, two of said waves having a phase angle between them such that said scanner provides a longitudinal scan of the focal plane of the beam.

36. A method of generating by an acousto-optical scanner a fast, longitudinal scan of a focal point of an optical beam, comprising the steps of:
disposing at least one acousto-optic element in the path of said beam; and
generating within said at least one acousto-optic element at least two sets of frequency-modulated counter-propagating acoustic waves, mutually angularly disposed to each other, two of said waves having a phase angle between them such that said scanner provides a longitudinal scan of the focal point of the beam without any lateral displacement.

37. A method of generating by an acousto-optical scanner a three-dimensional scan of a focal point of an optical beam, comprising the steps of:
disposing at least one acousto-optic element in the path of said beam; and
generating within said at least one acousto-optic element at least two sets of acoustic waves, mutually angularly disposed to each other, such that the beam is scanned in two dimensions, each set of acoustic waves comprising frequency-modulated counter-propagating acoustic waves;
scanning the center frequencies of each of said two frequency-modulated counter-propagating acoustic waves; and
wherein said counter-propagating acoustic waves in said sets have a phase angle between them such that said scanner provides a three dimensional scan of the focal point of said beam.

* * * * *